United States Patent [19]

Bening

[11] 4,317,500
[45] Mar. 2, 1982

[54] SAFETY START AND SHUTDOWN SYSTEM FOR VEHICLES HAVING ELECTRICALLY ACTIVATED POWER TAKE-OFF

[75] Inventor: Curtis R. Bening, Burnett, Wis.

[73] Assignee: Deere & Company, Moline, Ill.

[21] Appl. No.: 123,500

[22] Filed: Feb. 22, 1980

[51] Int. Cl.³ .............................................. B60K 27/08
[52] U.S. Cl. .................................. 180/273; 180/53 D
[58] Field of Search ............... 180/272, 273, 53 B, 180/53 D, 53 FE; 340/52 H, 689; 123/198 DC

[56] References Cited

U.S. PATENT DOCUMENTS

| | | | |
|---|---|---|---|
| 2,708,005 | 5/1955 | Gazzo | 180/273 |
| 3,229,452 | 1/1966 | Hasenbank | 180/273 X |
| 3,414,074 | 12/1968 | Dannettell | 180/273 |
| 3,511,328 | 5/1970 | Webb | 180/273 |

Primary Examiner—Joseph F. Peters, Jr.
Assistant Examiner—Michael Mar

[57] ABSTRACT

The safety start and shut-down system receives a current from a vehicle contained current source. The system receives the current and conducts the current through a plurality of contained switches so arranged such that an electrically activated clutch of a power take-off system cannot be activated or remain activated unless the vehicle's operator is properly stationed in the operator's station nor will the vehicle's engine remain operative.

5 Claims, 1 Drawing Figure

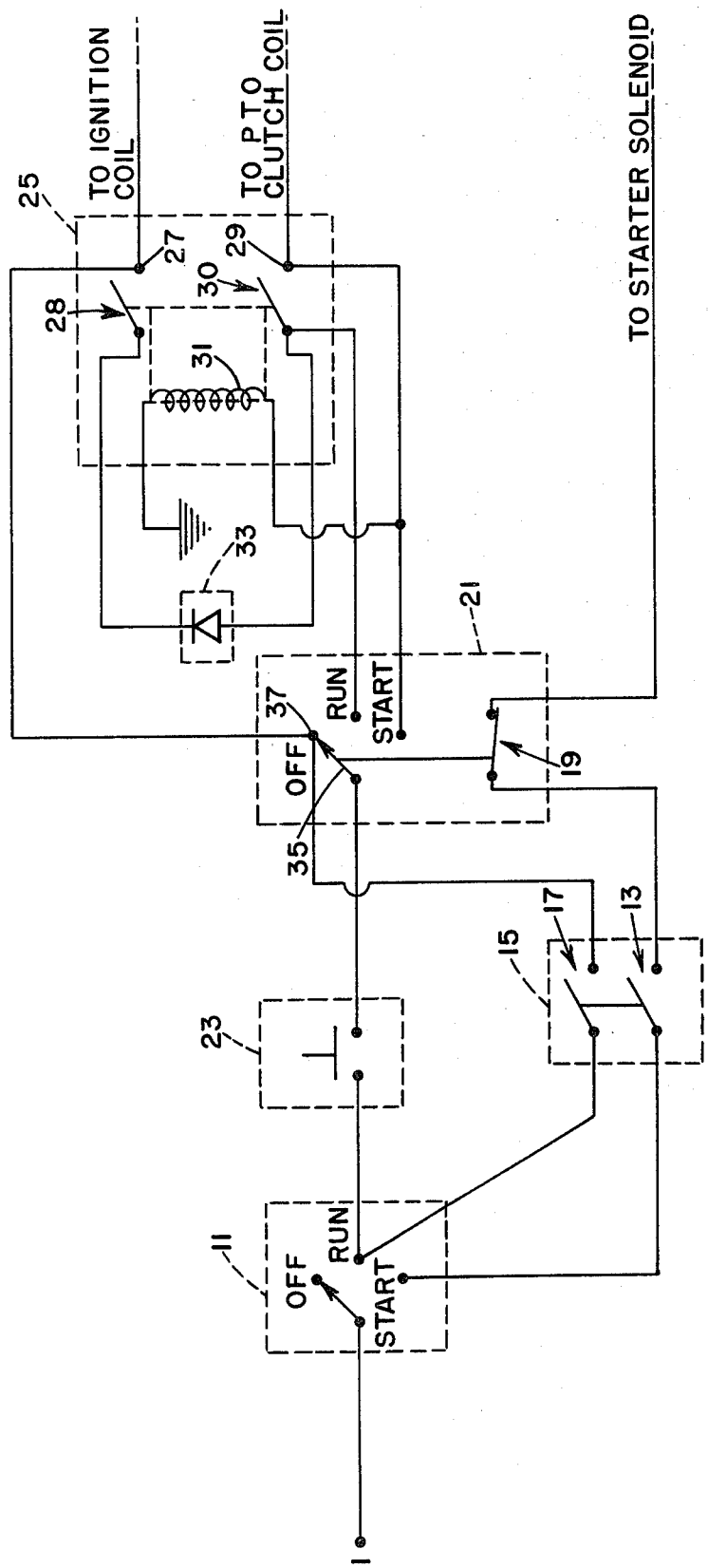

SAFETY START AND SHUTDOWN SYSTEM FOR VEHICLES HAVING ELECTRICALLY ACTIVATED POWER TAKE-OFF

BACKGROUND OF THE INVENTION

This invention relates to vehicles, e.g., tractors, having power take-off means, more particularly, to safety means of starting and shutting down the power take-off clutch assembly of the vehicle.

A vehicle, such as a lawn and garden tractor, customarily includes a power take-off system (PTO) to transmit power from the vehicle's engine to an implement attached to the vehicle. The vehicle may include a safety start and shut-down system, which disrupts the flow of current to the engine coil, deactivating the engine when the vehicle operator is improperly stationed within the vehicle. Because the vehicle's drive train may still be engaged, notwithstanding, deactivation of the engine, the momentum of the vehicle will cause continued operation of the vehicle engine for a specific period of time. Because a continued positive communication may exist between the engine and the PTO system, the PTO system will remain in operation for the same time period.

The present invention provides a means whereby should the vehicle's operator be improperly stationed the PTO system can be disengaged independently from the vehicle engine.

SUMMARY OF THE INVENTION

An ignition switch receives an electrical current from a vehicle carried current source. When the ignition switch is in the start position, the current is conducted to a neutral start switch and therefrom to the vehicle's starter solenoid to initiate operation of the vehicle's engine. The ignition switch is then placed in the run position wherefrom the current is again conducted to the neutral start switch, and therefrom to the vehicle ignition coil to maintain operation of the vehicle's engine. When the ignition switch is in the run position and the vehicle's drive system is engaged, the current is conducted from the ignition switch to a seat switch affixed to the vehicle operator's seat such that the switch is only closed upon the positioning of a vehicle operator thereon. When the seat switch is closed the current is conducted to a PTO clutch switch which when set in the start position results in the delivery of current to a PTO electrical clutch coil to engage the PTO clutch. The current is also conducted to a double-pole single throw (DPST) relay whereby both poles of the relay are closed causing the current to also be conducted to the engine ignition coil. When the PTO clutch switch is switched to the run position, the DPST relay is locked closed thereby allowing the continued flow of current to both the PTO clutch coil and ignition coil. When the vehicle operator removes himself from the seat, the seat switch is opened thereby disrupting the flow of current causing the DPST to open resulting in the independent disengagement of the PTO clutch and deactivation of the vehicle engine.

It is an objective of the present invention to provide a means for requiring a vehicle operator to be properly stationed within the vehicle in order to maintain operation of the vehicle and the vehicle's PTO system.

It is a further objective of the present invention to provide a safety system which prevents activation of the vehicle's engine when the PTO clutch switch is in the run or start position.

It is a still further objective of the present invention to present a safety mean which permits disengagement of the PTO system independent from deactivation of the vehicle's engine should the vehicle operator become improperly stationed.

BRIEF DESCRIPTION OF THE DRAWING

The drawing schematically shows a safety start and shut-down system according to the present invention.

DETAILED DESCRIPTION OF THE PREFERRED EMBODIMENT

Referring to the FIGURE, an electrical current I is delivered to a three-position (off, run, and start) ignition switch 11 from a vehicle current source (not shown). When the ignition switch 11 is in the start position, the received current I is conducted to a first stage 13 of a double stage open-closed neutral start switch 15 of conventional design which is in communication with the vehicle's drive system (not shown) in a conventional manner such that both stages 13 and 17 of the neutral starting switch 15 are closed only when vehicle's drive system is placed in a neutral mode. The Current I is then conducted to the vehicle's starter solenoid to instigate engine start-up through an open-close relay 19 located in a PTO clutch switch 21, which relay 19 is closed only when the PTO clutch switch 21 is in an off position.

When engine start-up is achieved, the ignition switch 11 is placed in the run position. With the ignition switch 11 in the run position, the current I is delivered to the second stage 17 of the double-stage neutral start switch 15, wherefrom the current I is conducted through a pole 37 corresponding to the off position of the PTO clutch switch 21 to the engine's ignition coil. In the run position a portion of current I is also delivered to a seat switch 23 which is closed by the positioning of an operator thereon. When the seat switch 23 is closed, the received current I is conducted therefrom to the PTO clutch switch 21. To engage the PTO system, the PTO clutch switch 21 is placed in the start position wherefrom the received current I is conducted to a PTO clutch coil to activate clutching of the PTO system (not shown). The PTO system most compatible with the present invention is of conventional design having electrically responsive clutching mean for engaging the PTO system. The current I received by the PTO clutch switch 21 is also conducted to a double-stage single throw relay 25 causing a contained relay coil 31 to close a first and second relay 28 and 30, respectively.

Once initial engagement of the PTO clutch is achieved by placing the PTO switch 21 in the start position, the PTO switch 21 is then reset to the run position whereupon the current I is conducted to the PTO clutch coil through relay 30. With the PTO switch 21 placed in the run position, the current I is also conducted from relay 30 through pole 29 to the relay coil 31 which locks the relay 25 closed, and to the relay 28 through a diode 33 wherefrom the current I is transmitted to the vehicle ignition coil. The diode 33 blocks a reverse flow of current from relay 28 to relay 30.

It is noted that engagement of the vehicle's drive system opens the neutral start switch 15 limiting the means by which the current can be delivered to the ignition coil. That is, with the operator seated, the PTO clutch switch 21 in the "off" position, and the drive system engaged, the current I is conducted through the seat switch 23 to the PTO clutch switch select arm 35 through the "off" position pole 37 to to the ignition coil. When the PTO clutch switch 21 is placed in the start position, the current I is conducted therefrom to the PTO clutch coil, the relay switch coil 31 closing the relay 25, and through relay 30 and diode 33 to relay 28 therefrom to the ignition coil. When the PTO clutch switch 21 is placed in the run position, the current I is again conducted to the PTO coil through the relay 30 to the relay coil 31 through the relay 30 which locks the relay 25 close, and through relay 30 and diode 33 to relay 28 and therefrom to the ignition coil.

Should the operator remove himself from the operator's seat while the vehicle drive system is activated and/or PTO system is engaged, the seat switch 23 will open, causing the interruption of current to the PTO switch 21. The loss of current causes relay 25 to open resulting in disengagement of the PTO system and deactivation vehicle engine. Because the PTO system is disengaged, PTO system is not subject to influence by vehicle momentum through the vehicle drive system. In order to reactivate the vehicle's engine, it will be necessary for the vehicle operator to be reseated and reset switch 15 and switch 21 to restart the vehicle.

I claim:

1. A safety start and shut-down system for a vehicle having an electrically clutched power take-off system, comprising:
    (a) first means for providing an electrical current;
    (b) an ignition switch having an off, run, and start position selectively engageable, said ignition switch to receive said current;
    (c) a double stage open-close switch, said double stage switch to have a first stage in communication with said ignition switch to receive said current from said ignition switch when said ignition switch is in said start position and a second stage in communication with said ignition switch to receive said current from said ignition switch when said ignition switch is in said run position, said double stage switch being in communication with said vehicle's drive system such that both said first and second stages are closed only when said vehicle's drive system is in a neutral mode;
    (d) first switch means in communication with and for receiving current from said ignition switch when said ignition switch is in said run position, said switching means to be closed only when a vehicle operator is properly stationed with respect to said vehicle;
    (e) first means for conducting said current from said first stage of said double stage switch when said first stage is closed to said vehicle's starter solenoid;
    (f) second means for conducting said current from said second stage of said double stage switch when said second stage is closed to said vehicle's ignition coil;
    (g) second switching means having an off, run, and start position selectively engageable, in communication with said first switching means for receiving said current from said first switching means when said first switching means is closed, when said second switching means is in said off position said received current to be directed to said second conducting means;
    (h) third means for conducting said current from said second switch means when said second switch means is in said start position to said vehicle's power take-off system coil; and
    (i) relay means in communication with and for receiving current from said second switch means when said second switch means is in either said start or run position, when said second switch means is in said start position said relay means to be responsive thereto to assume a closed mode, when said second switch means is in said run position said relay to be locked in said closed position to conduct received current to said second means and said third conducting means;

whereby improper stationing of said vehicle operator with respect to said vehicle when said vehicle's drive system is engaged causes said first switching means to open, thereby interrupting the flow of current in said system stopping said vehicle's engine and disengaging said vehicle's PTO system, said system must be reset to reactivate said vehicle and PTO system.

2. A safety start and shutdown system as claimed in claim 1 wherein said second switching means further comprises a second open-close relay means interrupting said first conducting means, said second open-close switch to be closed when said second switching means is in said "off" position and opens when said second switching means is in said "run" or "start" position.

3. A safety start and shut-down system as claimed in claim 1 or 2 wherein said relay mean comprises a double-stage single-throw relay including a first relay stage to receive current from said second switching mean when said second switching means is in said run position, a second relay stage in communication with and to receive current from said first stage, and means responsive to said current conducted from said second switching means when said second switching means is in said start or said run position to close said first and second stage relays of said double-stage single-throw relay.

4. A safety start and shut-down system as claimed in claim 3 wherein said double-stage single-throw relay further includes a gate means for allowing current to flow only from said first relay stage to said second relay stage.

5. A safety start and shut-down system having an electrically clutched power take-off system, comprising:
    (a) first means for providing an electrical current;
    (b) an ignition switch having an off, run, and start position selectively engageable, said ignition switch to receive said current;
    (c) a double stage open-close switch said double stage relay to have a first stage in communication with said ignition switch to receive said current from said ignition switch when said ignition switch is in said start position and a second stage in communication with said ignition switch to receive said current from said ignition switch when said ignition switch is in said run position, said double stage switch being in communication with said vehicle's drive system such that both said first and second stages are closed only when said vehicle's drive system is in a neutral mode;
    (d) a seat switch in communication with said ignition switch to receive said current from said ignition switch, said seat switch to be closed when a vehicle operator is seated within said vehicle;
    (e) first means for conducting said current from said first stage of said double stage switch when said first stage is closed to said vehicle's starter solenoid;

(f) second mean for conducting said current from said second stage of said double stage relay when said second stage is closed to said vehicle's ignition coil;

(g) power take-off switch having an off, run, and start position selectively engageable, in communication with said seat switch to receive said current from said seat switch when said seat switch is closed, said power take-off switch to be in communication with said second conducting means to direct received current thereto when said power take-off switch is in said off position;

(h) third means for conducting said current from said power take-off switch when said power take-off switch is in said start position to said vehicle's power take-off system coil;

(i) relay means for interrupting the flow of current through said first conducting means when said power take-off switch is in said run or off position;

(j) a double-stage single-throw relay including a first relay stage to receive current from said power take-off switch when said switch is in said run position, a second relay stage in communication with and to receive current from said first relay stage, a relay coil in communication with said power take-off switch to receive current therefrom when said power take-off switch is in said run or start position, said relay coil to communicate with said first and second stages to close said first and second relay stages upon the receipt of current by said relay coil, and a diode in communication with said first and second relay stages to permit the flow of current from said first relay stage to said second relay stage, said first relay stage to communicate with said third conducting means and said stage to communicate with said second conduct means to permit current to flow therefrom.

* * * * *